US006970762B1

(12) United States Patent
Elliott et al.

(10) Patent No.: US 6,970,762 B1
(45) Date of Patent: Nov. 29, 2005

(54) METHOD OF MONITORING OPERATION OF AN AUTOMATED TOOL AND ASSOCIATED APPARATUS

(75) Inventors: E. Wesley Elliott, Lower Burrell, PA (US); Gerald Vincent Delbrugge, Indiana, PA (US)

(73) Assignee: Oberg Industries, Freeport, PA (US)

( * ) Notice: Subject to any disclaimer, the term of this patent is extended or adjusted under 35 U.S.C. 154(b) by 0 days.

(21) Appl. No.: 10/761,871

(22) Filed: Jan. 21, 2004

Related U.S. Application Data

(63) Continuation-in-part of application No. 10/718,735, filed on Nov. 21, 2003.

(51) Int. Cl.[7] .............................................. G06F 19/00
(52) U.S. Cl. ..................................... 700/174; 702/183
(58) Field of Search .............................. 700/127, 174, 700/175, 177, 190; 702/33, 188, 183, 189

(56) References Cited

U.S. PATENT DOCUMENTS

| | | | | |
|---|---|---|---|---|
| 5,406,502 | A | * | 4/1995 | Haramaty et al. .......... 702/183 |
| 6,101,857 | A | * | 8/2000 | Fox et al. ..................... 72/15.1 |
| 6,122,565 | A | * | 9/2000 | Wenning et al. ............ 700/206 |
| 6,259,127 | B1 | * | 7/2001 | Pan ............................. 257/301 |
| 6,615,074 | B2 | * | 9/2003 | Mickle et al. ............... 600/509 |
| 2003/0030565 | A1 | * | 2/2003 | Sakatani et al. ............ 340/679 |
| 2004/0078662 | A1 | * | 4/2004 | Hamel et al. ................. 714/22 |
| 2004/0090326 | A1 | * | 5/2004 | Chin et al. .............. 340/539.22 |

OTHER PUBLICATIONS

Oppel et al. "Acoustic emission monitoring for stamping presses". Jul. 13, 2004 Stamping Journal.*
Tonshoff et al. "Using acoustic emission signals for monitring of production processes". Jun. 23, 2000, Ultrasonics vol. 37, issue 10 pp. 681-686.*
Verplaetse, "inertial proprioceptive devices: Self-motion sening toys and tools" 1996 IBM systems Journal, vol. 35 NOS 3&4.*
"MEMS", Dec. 2, 2004, Techweb.*
U.S. Appl. No. 60/362,432, Hamel et al., filed Mar. 2002.*

* cited by examiner

Primary Examiner—Albert W. Paladini
Assistant Examiner—Chad Rapp
(74) Attorney, Agent, or Firm—Philip E. Levy; Arnold B. Silverman; Eckert Seamans Cherin & Mellott, LLC (57) ABSTRACT

A method of monitoring operation of an automated tool includes positioning a wireless sensor or microelectromechanical system device having at least one sensor in close proximity to the automated tool, monitoring at least one condition of the automated tool, emitting signals containing sensor information in space to a processor which processes the sensor information and in the event the processor determines that the automated tool has departed from desired conditions issues a responsive signal. In one embodiment digital signals are transmitted from the sensor to the processor employing an RF carrier. Microprocessor responsive signals may be employed to initiate corrective action and initiate alarms as well as providing data. Corresponding apparatus for monitoring an automated tool is provided. In another embodiment of the invention, the sensor is energized remotely through energy transmitted in space such as RF energy.

36 Claims, 7 Drawing Sheets

METHOD OF MONITORING OPERATION OF AN AUTOMATED TOOL AND ASSOCIATED APPARATUS

CROSS REFERENCE TO RELATED APPLICATION

This application is a continuation-in-part of U.S. Ser. No. 10/718,735 filed Nov. 21, 2003 entitled "METHOD OF MONITORING OPERATION OF AN AUTOMATED TOOL AND ASSOCIATED APPARATUS".

BACKGROUND OF THE INVENTION

1. Field of the Invention

The present invention relates to an improved method and associated apparatus for facilitating monitoring of an automated tool for one or more operational characteristics in order to detect undesired interference with the operation of the same and, more specifically, it relates to such method and apparatus which employs a wireless sensor such as a microelectromechanical systems device (MEMS) structured to transmit sensor information in space. In one embodiment, the wireless sensor is remotely energized through energy transmitted in space with the sensor rectifying the received energy into DC current and also receiving communications from a remote microprocessor while delivering communications containing information originating within the sensor to the remote microprocessor.

2. Description of the Prior Art

It has been known to employ various sorts of sensors in connection with the monitoring of conditions of operating equipment including industrial equipment employed to perform manufacturing functions on workpieces. In such systems the information from sensors is frequently delivered to a controller unit which may employ the sensor data to determine whether an output signal effecting a change in control of the equipment should be generated. See, generally, U.S. Pat. No. 6,101,857, the disclosure of which is incorporated herein by reference.

It has been known to employ microelectromechanical systems devices and associated sensors to detect the various properties such as, for example, vehicle tire pressure. It has also been known to employ sensors which react to acceleration limits employing an inertial response, the calibrated mass and the elastic response of at least part of the sensor geometry. The deflection of the elastic response may be coupled with hardware that utilizes another property to communicate a condition that can be acted upon by the system control.

It has also been known to transmit data and energy between a base station and a remote station employing RF energy or other sources of energy in the transmission.

See U.S. Pat. Nos. 6,289,237 and 6,615,074, the disclosures of which are expressly incorporated herein by reference.

In spite of the foregoing teachings, there remains a meaningful need for an improved method of monitoring automated tools for undesired changes in operating properties of the system in order to facilitate prompt corrective action.

SUMMARY OF THE INVENTION

The present invention provides a method of operating an automated tool which includes positioning a wireless sensor such as a microelectromechanical system device having at least one sensor in close proximity to the automated tool, monitoring one or more conditions of the automated tool and emitting signals containing sensor information in space to a processor which processes the sensor information and, in the event it determines that the automated tool has departed from desired conditions of operation, issues a responsive signal.

The automated system may, for example, be a manufacturing apparatus working on the fabrication of a workpiece. It may be a progressive stamping die operating on a metal sheet workpiece.

The system, preferably, is wireless and, thereby, permits positioning of the sensor or sensors in close proximity to the region of the automated tool being monitored without requiring wires either as a source of power for the sensors such as a microelectromechanical system device or for communication.

In another embodiment of the invention, a system is provided for use of wireless sensors which are positioned within, or on, or closely adjacent to an automated tool with energy for powering the sensors and associated apparatus as well as permitting two way communication therewith through an antenna being provided in the wireless sensor.

Corresponding apparatus is provided.

It is an object of the present invention to provide a method of efficiently monitoring operation of an automated tool in a wireless manner so as to facilitate close positioning of sensors to the portion of the automated tool being monitored.

It is another object of the present invention to provide a method of employing microelectromechanical systems devices and other types of sensors in monitoring one or more operating conditions of an automated tool to effect early detection of interference.

It is another object of the present invention to monitor motion and force related conditions of the operating automated tool.

It is yet another object of the present invention to effect efficient and timely monitoring so as to resist undesired cost of repair and downtime for the system. It is a further object of the present invention to provide such a method and related apparatus to enhance the efficiency of performance of automated tools.

It is a further object of the present invention to provide a sensor employable with automated tools which is energized through power transmitted in space as contrasted with having a power storage device on board.

It is another object of the present invention to provide a method and related apparatus wherein a wireless sensor is secured within or on a surface of an automated tool.

These and other objects of the invention will be more fully understood from the following detailed description of the invention on reference to the illustrations appended hereto.

DESCRIPTION OF THE PREFERRED EMBODIMENTS

As employed herein, the term "automated tool" means a piece of equipment having one or more moving parts structured to engage in repetitive cycles of motion and shall expressly include, but not be limited to industrial manufacturing apparatus which has components that move relative to one another including, but not limited to, apparatus performing operations on a workpiece and equipment having components that can break, deform or wear.

As employed herein, the term "wireless" means that a device of the invention employable in a method of the invention may function efficiently without requiring a hard wired connection for delivering information obtained by a sensor to the processor and without requiring a wire to deliver power to energize the device.

As employed herein, a reference to transmission "in space" means that signals are being transmitted through air or similar medium regardless of whether the transmission is within or partially within an enclosure, as contrasted with transmission by a hard wired route.

As employed herein, the term "sensor assembly" shall refer to one or more sensors and associated components which may include at least one antenna and a rectifier.

Figure 1:
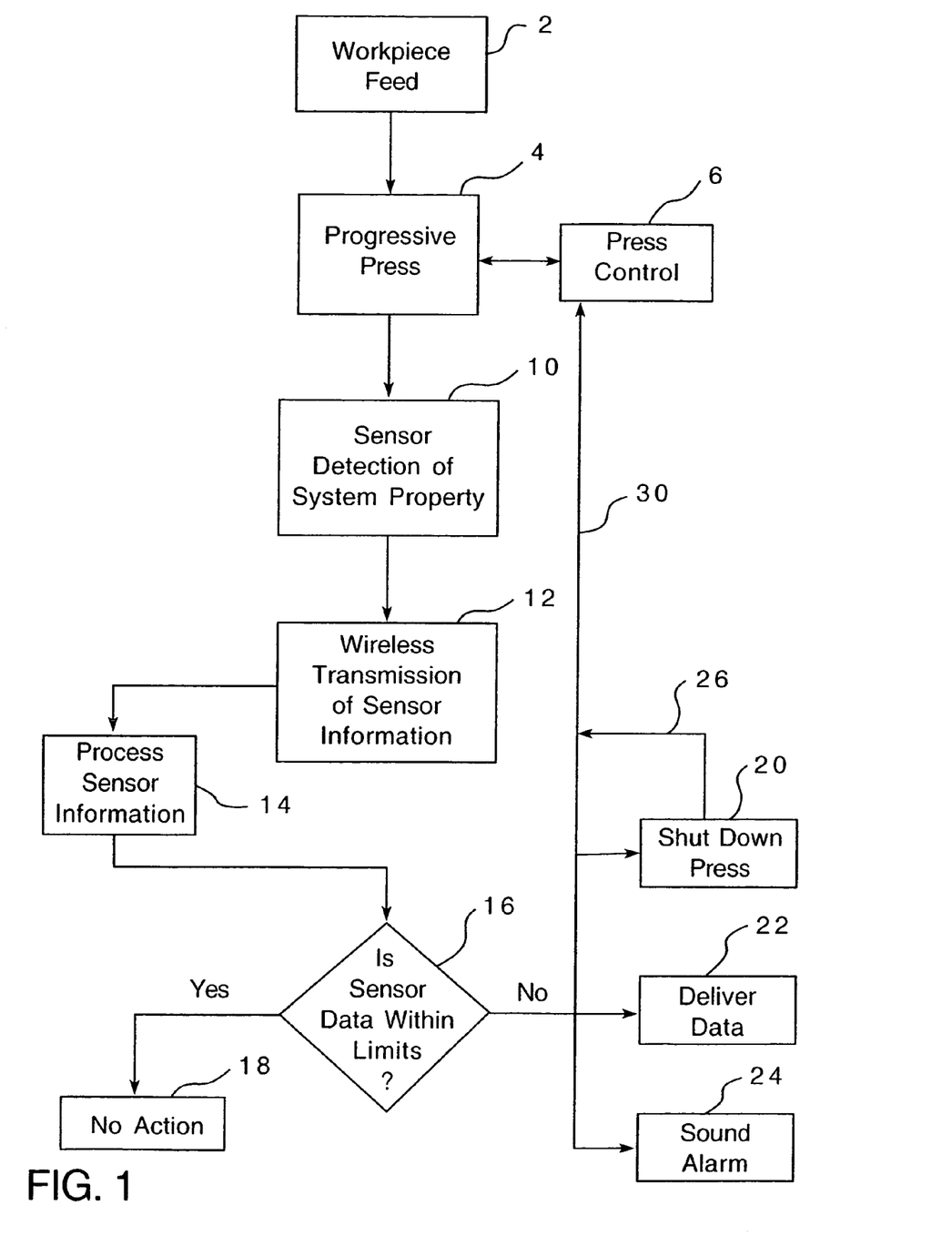
FIG. 1 is a schematic diagram of a form of method of the present invention.

Referring now to FIG. 1 wherein a method of the invention employed with an automated tool performing a function on a workpiece will be considered. The workpiece feed 2 introduces the workpiece which may, for example, be metal sheet into the automated tool which in the form shown is indicated as being a progressive press 4. Progressive press 4 is controlled by press control 6. While other types of sensors may be employed, the preferred form of sensor employed in the present invention is a microelectromechanical system (MEMS) device having one or more sensors. The microelectromechanical system sensor(s) 10 is employed to detect one or more properties of the automatic tool and emits sensor information through wireless transmission 12. The information is preferably processed and data recorded continuously 14 with a determination 16 being made as to whether the sensor data is within the predetermined limits. If the answer is "yes", no action 18 is taken. If the answer is "no", one or more of several alternate actions may be taken. A responsive signal may be emitted to (a) shut down the press 20 through a signal 26, 30 to the press control 6 or (b) to deliver data 22 or (c) to sound an alarm 24 or (d) to deliver a signal 30 to the press control 6 in order to initiate corrective action other than shutting down of the press or any desired combinations of responsive signals may be employed.

Figure 2:
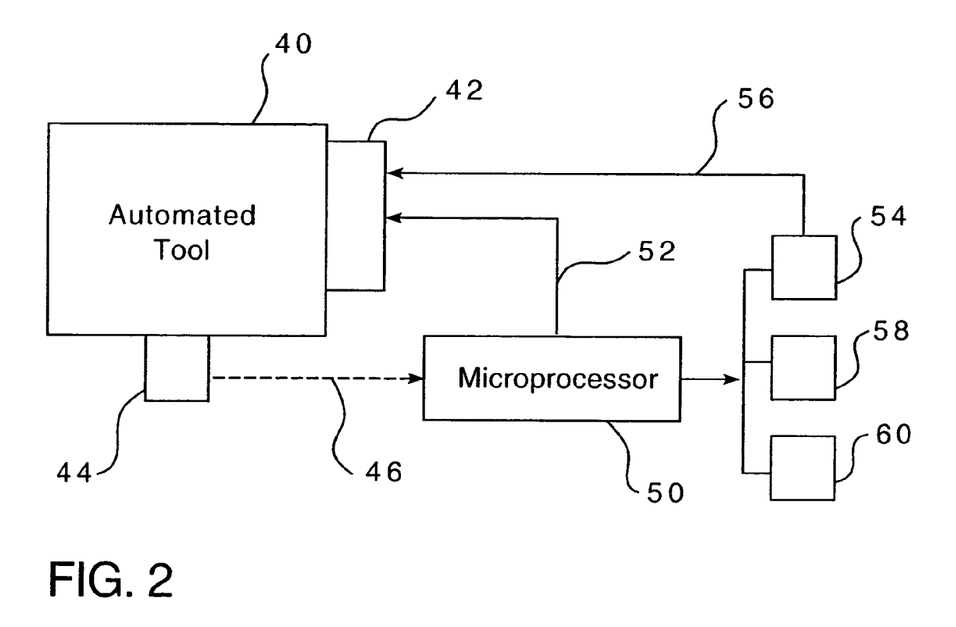
FIG. 2 is a schematic illustration of a form of apparatus employable in the present invention.

Referring now to FIG. 2, there is shown automated tool 40 controlled by controller 42 with a microelectromechanical device sensor 44 monitoring one or more conditions and providing sensor information 46 through space to a microprocessor 50, preferably as digital information and employing an RF carrier. The microprocessor 50 effects a comparison between the sensor information transmitted in signal 46 with the stored desired parameters in order to make the comparison 16 referred to in FIG. 1. The result may be to deliver this information by signal 52 to controller 42 or to shut down the automated tool 40 through unit 54 and signal 56 or to deliver data which may be presented in any desired form as in hard copy form or by computer monitor with or without intervening storage or enhancement 58 or to sound an alarm 60.

In the alternative, if desired, the sensor device 44 may be so created as by a smart microchip so as to emit signals 46 only when there has been a departure from the desired characteristics.

In general, the microelectromechanical system device and sensors may be energized by a battery operatively associated therewith or may be remotely provided with energy through an onboard capacitor which is remotely charged or by energization such as disclosed in U.S. Pat. No. 6,289,237 or 6,615,074.

Figure 3:
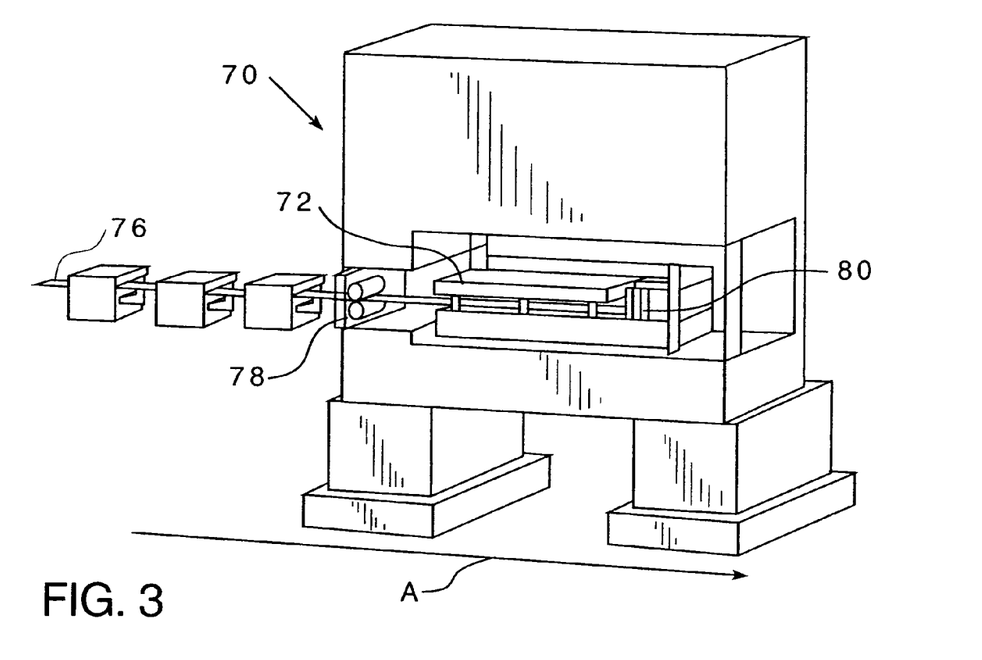
FIG. 3 is a partially schematic illustration of an automated tool employable in the progressive performance of operations on a workpiece.

Referring now to FIG. 3, there is shown an automated tool in the form of a progressive stamping press for sequentially creating fabricated or semifabricated articles such as, for example, rotors or stators, by means of a punch press 70 and an associated progressive die set 72. In the form illustrated, the workpiece, which is metal strip 76, travels into the press 70 and through the press 70 in the direction indicated by arrow A. A roll feed 78 serving to intermittently advance the workpiece through the die sets 72 in coordination with press operation. A microelectromechanical system device having an appropriate sensor or sensors of the present invention may be positioned at point 80, for example, in order to monitor for various conditions such as improper web feed. It will be appreciated that, in view of the wireless nature of the present microelectromechanical system device and its associated sensor or sensors, the device may be positioned in close proximity to the condition being monitored.

Figure 4:
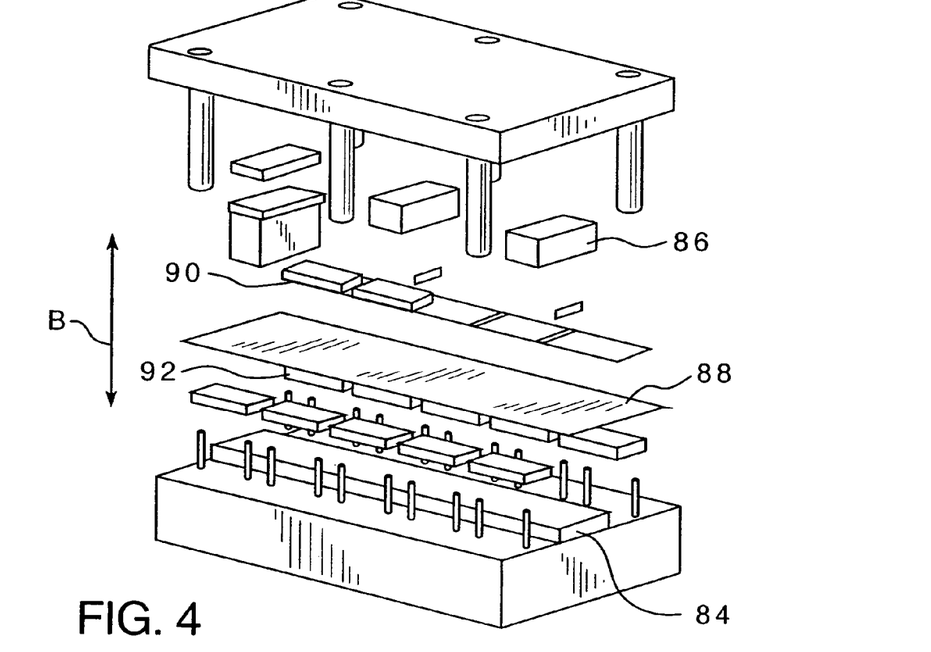
FIG. 4 is an exploded schematic view of a form of progressive die design showing dies usable in the press of FIG. 3.

Referring to FIG. 4, there is shown an example of a progressive die set usable in the press 70 shown in FIG. 3. The punch and die are subjected to relative movement through generally vertical reciprocation as indicated by the two headed arrow B. A die half 84 cooperates with a punch half 86 to perform the desired multistage fabrication on metal strip 88 with an appropriate lifter/stock guide 90 being provided above the workpiece 88 and a lifter/stock guide 92 being provided thereunder.

Figure 5:
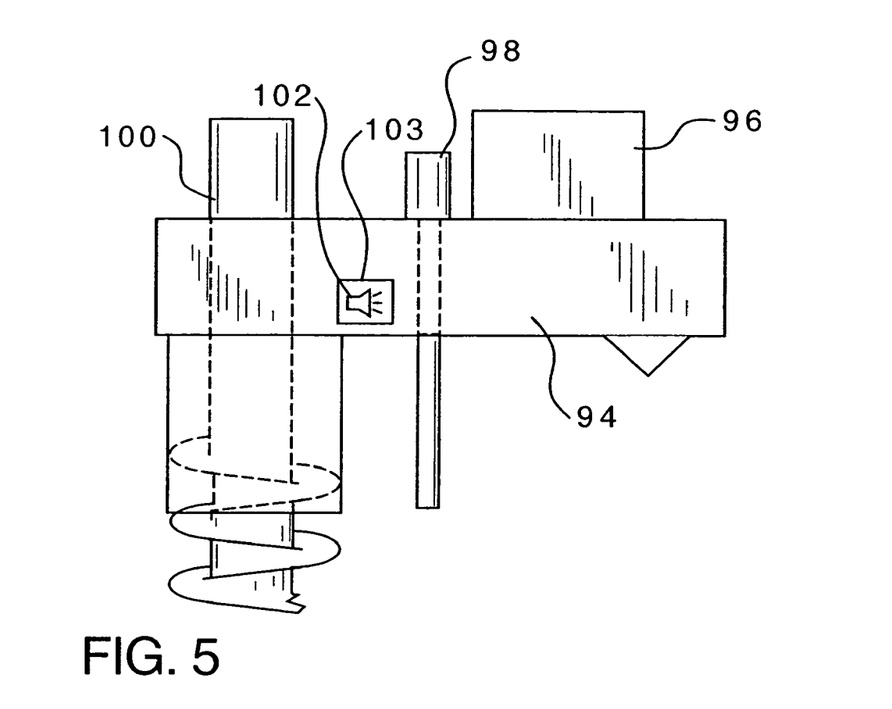
FIG. 5 illustrates schematically in elevation a segment of the die and workpiece feed employed with a sensor of the present invention.

Referring to FIG. 5, there is shown in plan schematically the upper support and restraining elements 94, 96, 98, 100 with a microelectromechanical system device 102 shown as being embedded in an opening in the metal. The sensor 102, in the form shown, is embedded in a hole 103 in element 94 or otherwise secured thereto.

In the alternative, the sensors may be of nanoscale, which allows them to be part of the workpiece material without significantly affecting the physical or mechanical properties of the metal strip.

The microelectromechanical system device may be employed to detect temperature or position of an automated tool component or detect excessive differential velocity with respect to time and subsequently transmit digital information using an RF carrier signal to a receiver for appropriate processing. Time-dependent differential velocity is proportional to acceleration and, as a result, force, and is related to the amount of resistance to kinematics or motion of the automation.

It will be noted that a preferred form of sensor is an inertial sensor which contributes to monitoring of kinematic aspects of the automated tool.

It will be appreciated that the hereinbefore described advantages of the invention may be achieved in this manner with sensor systems requiring wiring, not being capable of functioning in this manner.

It will be appreciated, therefore, that the present invention provides an improved means for monitoring automated tools for early and effective detection of undesired interference so that prompt action can be taken. By employing a wireless system, the microelectromechanical system device may be placed for the most efficient viewing of the property being monitored. By transmitting in a wireless fashion, the processor and associated units receiving output therefrom may operate efficiently as well.

Figure 6:
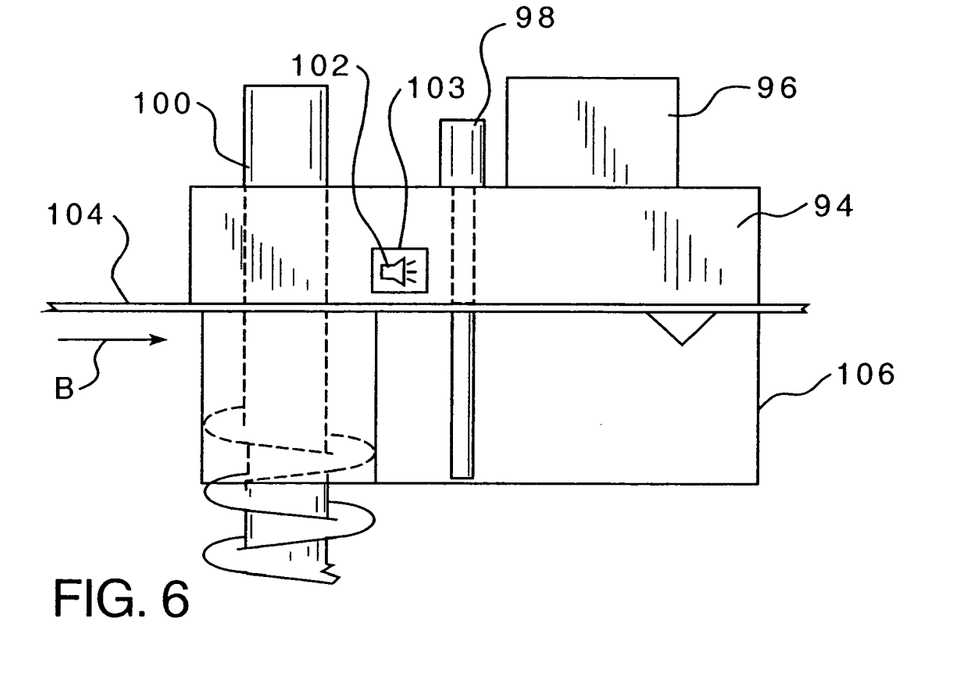
FIG. 6 is similar to FIG. 5, but shows the die in a closed position with a strip-like workpiece clamped therebetween.

In the form shown in FIG. 6, with the workpiece in the form of a metal strip 104 which travels in the direction of arrow B and is clamped between die components 94 and 106, the sensor would of necessity have to be wireless as a wire would be crushed between the die components 94, 106 as shown in FIG. 6.

Figure 7:
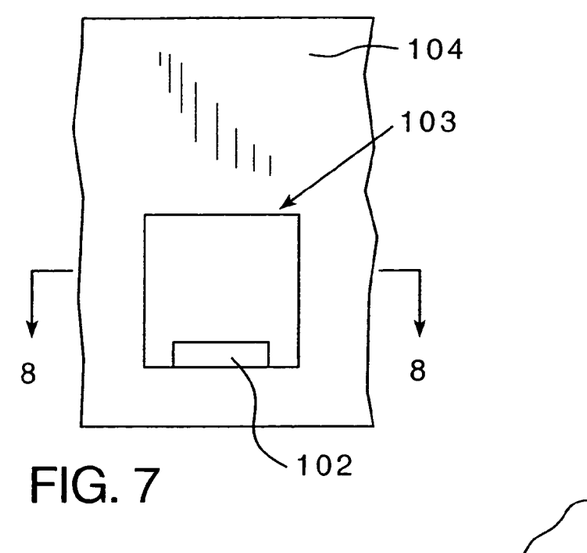
FIG. 7 is a fragmentary illustration of an opening in the apparatus with a sensor of the invention placed therein.
Figure 8:
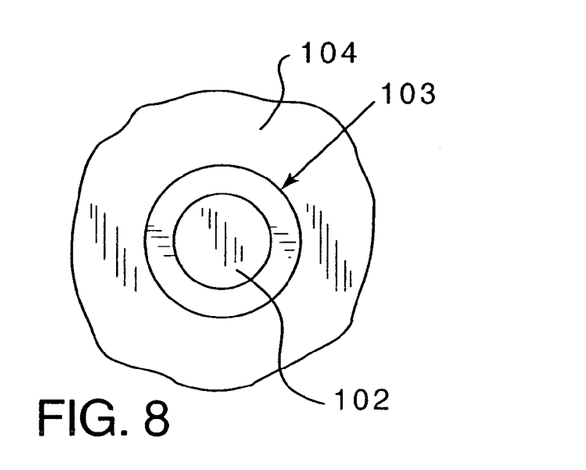
FIG. 8 is a cross-sectional illustration taken through 8—8 of FIG. 7 showing a recess in the die with a sensor positioned therein.

Referring to FIGS. 7 and 8, it is seen that a recess 103 is defined within die component 104 with a sensor 102 provided therein. The sensor 102 may be secured within the recess 103 by any suitable means well known to those skilled in the art, such as mechanical fasteners or suitable adhesives.

Figure 9:
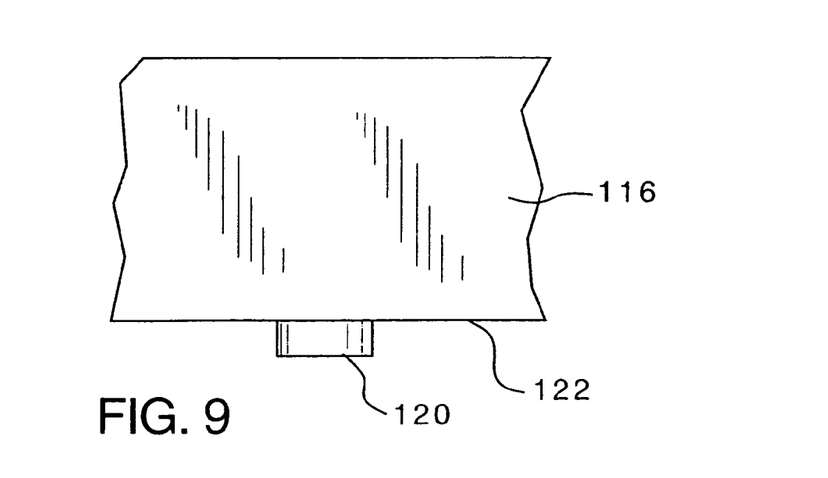
FIG. 9 is an illustration of an embodiment of the invention wherein the sensor is secured to an exterior surface of the apparatus.

In the embodiment shown in FIG. 9, the die component 116 has the sensor 120 secured to an exterior surface 122. In either event, the sensor or workpiece 120 will be in a position in close proximity to or within the automated tool or workpiece, but not be in a position where it would come into potentially damaging contact with the workpiece or other components of the automated tool.

Figure 10:
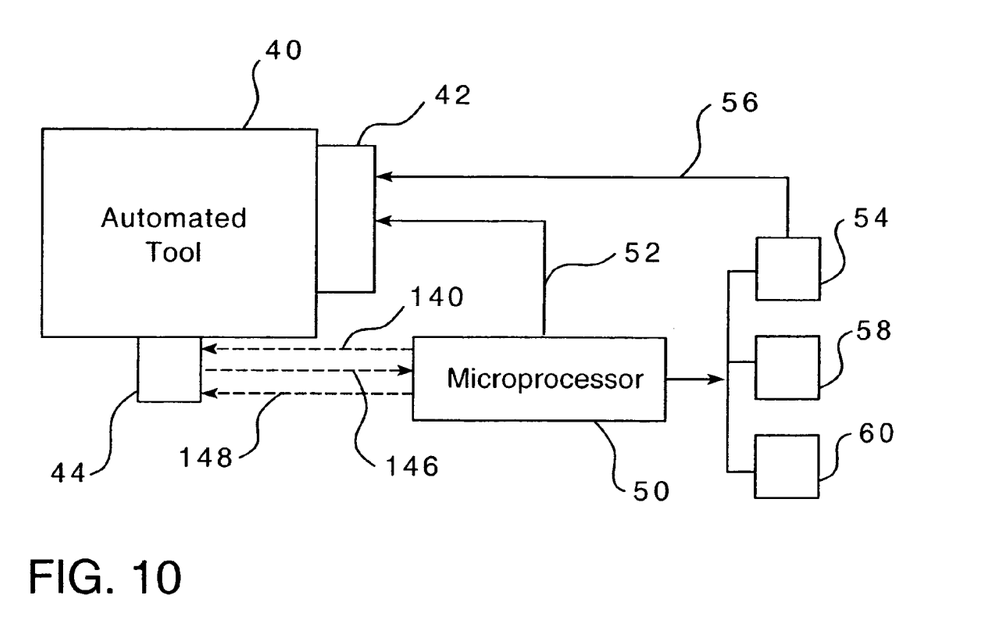
FIG. 10 shows schematically an automated tool and associated microprocessor and sensor arrangement with the delivery of energy and information to the sensor and delivery of information from the sensor to a microprocessor.

Referring to FIG. 10 wherein like reference numbers to the elements shown in FIG. 2 refer to the same elements, it will be seen that the concept involves the sensor 44 receiving through space, power 140 which may be in the form of RF energy, for example. Power 140 may be converted to DC energy through rectification within the assembly of sensor 44 with the resultant interrogation of the sensor or sensors 44 providing communication of data in space as represented by 146 with data or other information 148 being provided in space from the microprocessor 50 to the sensor 44, both of which have appropriate antennae.

Figure 11:
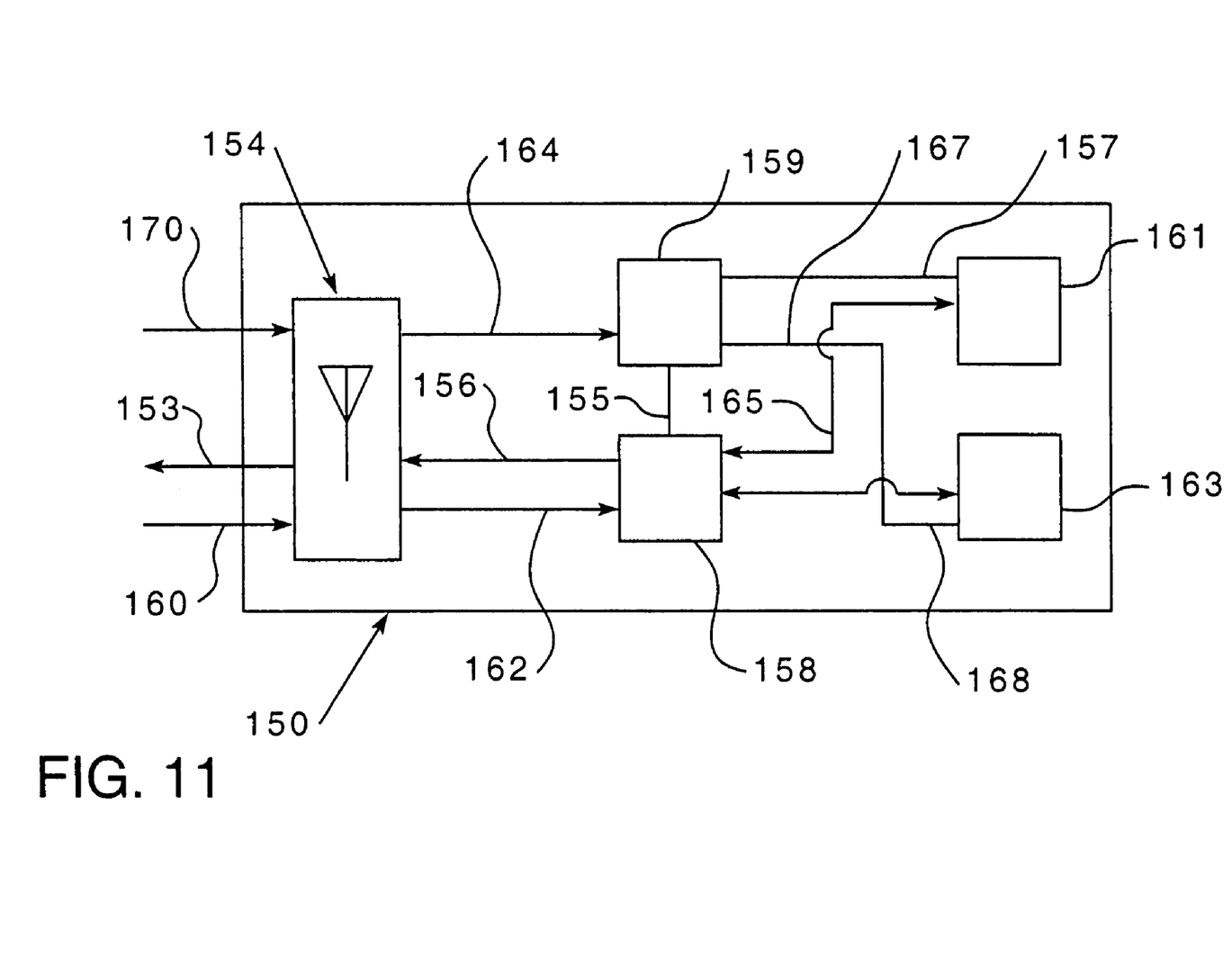
FIG. 11 is a schematic illustration of a form of sensor assembly including representations of data and power transmission through space.

Referring to FIG. 11, there is shown a sensor assembly 150 which, in the form shown, contains sensors 161, 163 as well as rectifier 159 for converting the energy (represented by lines 164, 170) transmitted in space as represented by signal 170 entering an antenna 154 and signal 164 moving from the antenna 154 to the rectifier 159. The rectified DC power is delivered to sensor 161 over electrically conductive path 157, to sensor 163 over electrically conductive path 167 and to microprocessor 158 over electrically conductive path 155. Information signal 160 delivered to sensor assembly 150 through space from a base unit as shown, for example, in FIG. 10, will be received by antenna 154 and pass in the form of information signal 162 to microprocessor 158 which is in communication with sensors 161, 163 through electrically conductive paths 165, 168, respectively. The microprocessor 158 also receives information from sensors 161, 163 and delivers the information over by signal 156 through antenna 154 to signal 153 which is transmitted to the desired base unit which has an antenna for receiving information signal 153 and introducing it into a microprocessor such as 50 in FIGS. 2 and 10.

In this manner, the energy for the wireless sensor is provided remotely along with whatever communication is desired, while outgoing communication from the sensor is also provided all through antenna 154. It will be appreciated that the sensor assembly may be miniaturized and antenna may conveniently be operatively associated with the sensors on an intelligent chip or a printed circuit board, for example.

If desired, in lieu of a single antenna 154, separate receiving and transmitting antennae may be employed.

Whereas particular embodiments of the invention have been described herein for purposes of illustration, it will be appreciated by those skilled in the art that numerous variations of the details may be made without departing from the invention as described in the appended claims.

What is claimed is:

1. A method of monitoring operation of an automated tool comprising positioning in close proximity to said automated tool at least one wireless sensor, energizing said wireless sensor by energy transmitted in space to said sensor, monitoring at least one condition of said automated tool by said sensor, emitting signals containing sensor information in space to a microprocessor only if said at least one condition departs from a desired threshold value, processing said sensor information in said microprocessor, and in the event that the microprocessor determines that said automated tool has departed from desired conditions of operation issuing a responsive signal.

2. The method of claim 1 including
employing RF energy to energize said sensor.

3. The method of claim 1 including
emitting signals containing information from said microprocessor to said sensor.

4. The method of claim 2 including
converting said RF energy to DC power for energizing said sensor.

5. The method of claim 1 including
securing said sensor to said automated tool.

6. The method of claim 5 including
securing said sensor within a recess in said automated tool.

7. The method of claim 6 including
said sensor being operatively associated with at least one antenna for simplex power reception and duplex communication of information.

8. The method of claim 7 including said antenna formed on an integrated circuit.

9. The method of claim 7 including said antenna secured to a printed circuit board.

10. The method of claim 1 including
employing said method to monitor a said automated tool performing an operation on a workpiece.

11. The method of claim 10 including
said at least one sensor being in a microelectromechanical system device.

12. The method of claim 11 including
employing a plurality of said sensors in said method.

13. The method of claim 11 including
measuring by said microelectromechanical system device at least one motion related characteristic of said automated tool.

14. The method of claim 10 including
employing as said automated tool a progressive stamping press operating on a metal sheet workpiece.

15. The method of claim 11 including
sensing by said microelectromechanical system device characteristics of said automated tool related to forces existing in the operation of said automated tool.

16. The method of claim 13 including
monitoring said automatic tool properties by said microelectromechanical system device during at least a portion of a cycle of operation of said automated tool.

17. The method of claim 1 including
monitoring at least one acceleration related characteristic of said operating automated tool.

18. The method of claim 1 including
transmitting said sensor signals to said microprocessor employing an RF carrier.

19. The method of claim 18 including
transmitting said sensor information as digital information.

20. The method of claim 11 including
employing in said microelectromechanical system device an inertial sensor.

21. The method of claim 14 including
employing said method to monitor misfeed.

22. The method of claim 1 including
selecting said responsive signals from a group consisting of an automated tool shutdown, alarm signal and data delivery signal.

23. The method of claim 10 including
securing said sensor to said workpiece.

24. Apparatus for monitoring operation of an automated tool comprising
an automated tool,
a source of energy for energizing at least one wireless sensor by energy transmitted in space,
at least one wireless sensor for monitoring a condition of said automated tool and emitting sensor signals through space only if a monitored condition departs from a desired threshold value,
a microprocessor for receiving said sensor signals and determining if a departure from a desired characteristic exists and if so emitting a responsive signal.

25. The apparatus of claim 24 including
said at least one wireless sensor being in a microelectromechanical system device.

26. The apparatus of claim 25 including
said apparatus having a plurality of said sensors.

27. The apparatus of claim 24 including
said automated tool being a progressive stamping press for performing operations on a metal sheet workpiece.

28. The apparatus of claim 25 including
said microelectromechanical system device being structured to monitor force related characteristics.

29. The apparatus of claim 27 including
said microprocessor responsive signals being selected from a group consisting of an automated tool shutdown signal, an alarm signal, and a data delivery signal.

30. The apparatus of claim 24 including
said microelectromechanical system device being structured to monitor an acceleration related condition.

31. The apparatus of claim 24 including
said source of energy being a source of RF energy.

32. The apparatus of claim 31 including
a rectifier operatively associated with said sensor for converting said RF energy to DC power for said sensor.

33. The apparatus of claim 32 including
a simplex power, duplex communication antenna operatively associated with said sensor.

34. The apparatus of claim 33 including
a sensor assembly including said rectifier, said antenna and said sensor.

35. The apparatus of claim 34 including
said sensor assembly secured within a recess in said automated tool.

36. The apparatus of claim 24 including
said sensor being structured to be secured to a workpiece.

* * * * *

UNITED STATES PATENT AND TRADEMARK OFFICE
CERTIFICATE OF CORRECTION

PATENT NO. : 6,970,762 B1
DATED : November 29, 2005
INVENTOR(S) : E. Wesley Elliott et al.

It is certified that error appears in the above-identified patent and that said Letters Patent is hereby corrected as shown below:

<u>Column 7,</u>
Line 16, "claim 1" should read -- claim 11 --.

Signed and Sealed this

Twenty-first Day of February, 2006

JON W. DUDAS
*Director of the United States Patent and Trademark Office*